(12) United States Patent
Bass

(10) Patent No.: US 6,853,979 B1
(45) Date of Patent: Feb. 8, 2005

(54) METHOD FOR MARKETING GOODS AND SERVICES

(75) Inventor: Michael A. Bass, Chagrin Falls, OH (US)

(73) Assignee: Hy-Ko Products Company, Northfield, OH (US)

(*) Notice: Subject to any disclaimer, the term of this patent is extended or adjusted under 35 U.S.C. 154(b) by 26 days.

(21) Appl. No.: 09/855,062

(22) Filed: May 14, 2001

Related U.S. Application Data

(60) Provisional application No. 60/225,224, filed on Aug. 14, 2000.

(51) Int. Cl.$^7$ .............................................. G06F 17/60
(52) U.S. Cl. ............................ 705/26; 40/584; 283/56
(58) Field of Search .................... 705/26, 27; 709/207, 709/219; 381/124; 283/56; 40/584

(56) References Cited

U.S. PATENT DOCUMENTS

| | | | | | |
|---|---|---|---|---|---|
| 4,541,190 | A | * | 9/1985 | Weiner et al. | 40/610 |
| 5,793,972 | A | * | 8/1998 | Shane | 395/200.49 |
| 5,799,285 | A | * | 8/1998 | Klingman | 705/26 |
| 5,915,093 | A | * | 6/1999 | Berlin et al. | 709/219 |
| 5,920,634 | A | * | 7/1999 | Chiquette | 381/124 |
| 6,003,255 | A | * | 12/1999 | Mahoney et al. | 40/611.05 |
| 6,041,310 | A | * | 3/2000 | Green et al. | 705/27 |
| 6,263,601 | B1 | * | 7/2001 | Emert | 40/564 |
| 6,430,605 | B2 | * | 8/2002 | Hunter | 709/207 |
| 2001/0049986 | A1 | * | 12/2001 | Roberts et al. | 83/13 |
| 2002/0087420 | A1 | * | 7/2002 | Higgins et al. | 705/26 |

FOREIGN PATENT DOCUMENTS

| | | | | | |
|---|---|---|---|---|---|
| FR | 2206545 | A | * | 7/1974 | G09F/3/00 |
| JP | 08036369 | A | * | 2/1996 | G09F/7/02 |
| WO | 2220023 | A1 | * | 6/1999 | G09F/13/02 |

OTHER PUBLICATIONS

Petitt, Chris; "Contour software offers multiple lead generation tech solutions response system to provide leads for Realtors and mortgage companies"; Origination News, v 6, n 828, p 40; May 1997; extracted from Dialog database on Internet from File 9, Ac.*

Feigenbaum, Randi; " Cover Story / On their Own"; Newsday; Long Island, N.Y.: Jun. 25, 1999, extracted on Internet on Jul. 1, 2004 from web site: http;// proquest.umi.com.*

Press release, "Owners.com Unveils Powerful New Site for Home Sellers and Home Buyers"; Jan. 21, 1999 extracted on Internet from the web site: http://web.archive.org/web/20000618013127/www.owners.com on Dec. 5, 2003.*

Rogers et al. ; << Online companies find niche in sales owners get help witrh selling homes themselves; Richmond Times–Dispatch; Richmond, VA; Jul. 9, 2000; extracted on Internet on Dec. 5, 2003.*

FSBO Advertising Service, Inc. (see copies of web pages as available on Mar. 2, 2000, on their web site fsboadverising-service.com and extracted from waybackmachine web site, www.archive.org on Jan. 9, 2003.*

Business Editors, " Cameraworld.com Ad strategy Gets First Exposure in Seattle", Business Wire; New York; Mar. 8, 1999, 2 pages extracted on Internet from http://proquest.umi.com database on 01/13/200.*

(List continued on next page.)

Primary Examiner—Yogesh C. Garg
(74) Attorney, Agent, or Firm—Pearne & Gordon LLP

(57) ABSTRACT

A method of marketing a good or service is provided including the step of providing a sign having a preprinted website address and an indication that a good or service is for sale. The method further includes providing a website where sellers can post information about the particular good or service. Consumers can visit the website indicated on the sign and view the posted information for a particular good or service by reference to a unique identifier, such as an identification number, listed on the sign.

29 Claims, 2 Drawing Sheets

---

AUTO FOR SALE

For more information visit our website and enter the following identification number:

ID# 123456

Or contact the seller as indicated below:

Phone: _____ Email: _____ www.sharpcar.com

OTHER PUBLICATIONS

Anonymous, "Now we're the great daily of Beckindale", Northern Echo; Darlington; Jun. 4, 1999, 1 page, both publications extracted on Internet from http://proquest.umi.com database on Jan. 13, 2003.*

Kippy Burns, 'An Outdoor Web World', Signs of the Times, Aug. 1997, p. 36.*

Sandra Lillywhite, "*Where Results Exceed Your Expectations*" advertisement, Jun. 2, 2001, Montgomery County Homebuyer's Journal, pp. Cover page, 2, 49.

Sandra Lillywhite, *HomesDatabase* website, http://www.homesdatabase.com/sandralillywhite/mris_search.shtml, 1999, 4 pages.

* cited by examiner

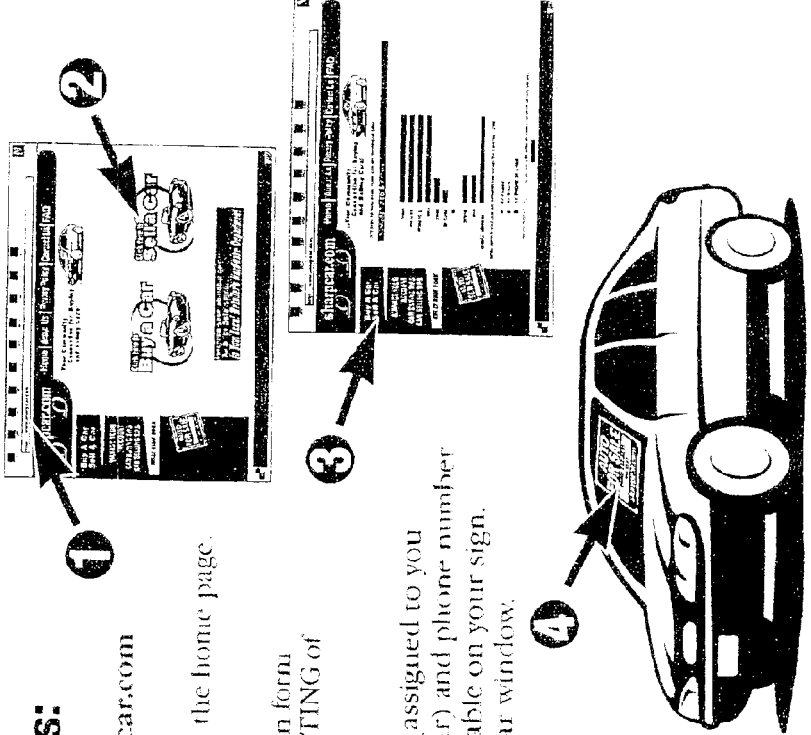

METHOD FOR MARKETING GOODS AND SERVICES

CROSS-REFERENCE TO RELATED APPLICATIONS

This application claims the benefit of U.S. Provisional Patent Application Ser. No. 60/225,224 filed on Aug. 14, 2000.

BACKGROUND OF THE INVENTION

As a general practice, sellers post "For Sale" signs as an inexpensive means of informing consumers that a particular good or service is for sale. Though inexpensive, such signs have achieved varying and unpredictable success as marketing tools. A major disadvantage to this form of advertising is that consumers typically want to inspect the good or service for sale before deciding whether or not to purchase. Therefore, traditional "For Sale" signs depend upon passers-by to either take the time upon seeing the sign to further investigate the good or service for sale, or make a mental note to return and investigate later.

Unfortunately, passers-by are always on their way somewhere and often cannot take time to stop and investigate upon seeing a "For Sale" sign. Further, mental notes are too often recalled either at a time when the consumer cannot return to investigate the good or service, or when he has become disinclined to do so because of inconvenience.

Traditional "For Sale" signs have addressed this problem by indicating a phone number that a potential purchaser may call for more information. Unfortunately, many consumers are hesitant to speak to sellers for fear of a pushy salesperson's pitch. In addition, many consumers wish to preserve their anonymity while gathering information.

Consequently, there is a need in the art for a method of "For Sale" sign advertising that provides consumers an easy and convenient means of investigating a good or service on their own time. Preferably, such a method would enable consumers to anonymously investigate a good or service using a personal computer at any time the consumer finds convenient.

SUMMARY OF THE INVENTION

A method for marketing a good comprising the steps of (a) providing a sign, said sign having a preprinted website address, a space for a unique identifier, and an indication that a good is for sale, and (b) providing a website at said website address, said website being adapted to permit a seller to post on said website under said unique identifier information about said good, said website being further adapted to permit a prospective purchaser to view said information. A sign for sale of a good is also disclosed.

BRIEF DESCRIPTION OF THE DRAWINGS

FIG. 3 is an instruction sheet for use with a sign according to the invention

DETAILED DESCRIPTION OF THE PREFERRED EMBODIMENTS OF THE INVENTION

As used herein and in the appended claims, "good" or "goods" means any tangible or intangible good, or any service, that is or could be offered for sale by a seller using the marketing method of the present invention. For example, the good can be a house, apartment, car, trailer, furniture, boat, real estate, factory, airplane, etc. The method of the present invention comprises the steps of providing a sign with an indication that a good is for sale (such as a sign that says "FOR SALE"), and a website where sellers can input or post information about the good which is subsequently available to consumers.

Figure 1:
FIG. 1 is an "AUTO FOR SALE" sign according to a first embodiment of the present invention.

Referring to FIG. 1, a sign is provided listing a good for sale, and a preprinted website address at which a consumer can obtain information about the good using a unique identifier, such as a unique identification number, according to a first preferred embodiment of the invention. Though the sign of FIG. 1 is for an "AUTO FOR SALE", other goods and services can be marketed using a sign according to the invention as shown in FIG. 1, including "VEHICLE FOR SALE", "HOUSE FOR SALE", "FOR SALE", "FOR RENT", "GARAGE SALE", etc.

Figure 2:
FIG. 2 is an "AUTO FOR SALE" sign according to a second embodiment of the present invention.

FIGS. 1 and 2 show the website address preprinted on the sign, that is, when the purchaser purchases the sign from a store such as K-Mart, the website address has already been printed on the sign by the manufacturer.

The sign comprises a sign substrate which can be made of any suitable material, preferably a hard plastic, or any other known material capable of withstanding the elements. The sign can be provided listing a particular good for sale preprinted on one face thereof, for example a car. In this embodiment, a multitude of signs according to the present invention are provided for sellers, with various types of goods preprinted thereupon. Alternatively, a generic sign according to the present invention can be provided with a blank space where the seller must fill in a description of the good for sale himself. Having purchased the sign and filled in the necessary information, a seller would then post the sign in a conspicuous place to attract consumer attention as generally known in the art, such as a front lawn, car window, etc.

Referring to FIG. 2, and according to a second preferred embodiment of the present invention, the sign can be provided with spaces for the seller to list a telephone number, email address, or other direct or personal contact information for those consumers who wish to contact the seller directly in addition to visiting the website.

Whether according to the first or second embodiment, a sign according to the invention displays a unique identifier which consumers can use to locate information relevant to the good for sale at the indicated website. Preferably, the unique identifier is a sequence of numbers, letters, or numbers and letters, preferably at least 2, 3, 4, 5, or 6 characters in length. The sign can be provided with a blank space (see for example FIG. 1) for the seller to fill in a unique identifier corresponding to the good on the website. In this embodiment, the seller, after purchasing the sign (such as shown in FIG. 1), would log onto the website, input or post information pertaining to his good for sale (such as type of good, condition, price, location, how to contact seller, etc.), and receive a unique identifier, such as a unique identification number, from the website which he would then enter or provide in the appropriate space on the sign. In this embodiment the website provides the unique identifier to the seller in connection with the seller posting the information on the website. The sign of FIG. 2 can also be used for this embodiment, except that the identification number is not preprinted.

Alternatively, the sign can be provided with the unique identifier already imprinted or preprinted thereon (see FIG.

2). In this embodiment the seller is prompted to activate the unique identifier preprinted on the sign when he logs onto the website to input the information about the good for sale. Whether the unique identifier is provided with the sign, or is provided by the website for the seller to print on the sign, consumers would access the information input by the seller relevant to a particular good via reference to its unique identifier. It will be observed in all the cases described above that the website permits the seller to post on the website under the unique identifier information about the good. In a preferred embodiment of the invention, the only cost to the seller is the cost of purchasing the sign; there is no charge for the listing or the other website services. Less preferably, the seller can be charged a fee in connection with the posting of the information and/or the sale of the good.

In addition to the above information, the sign optionally can be provided with additional specific instructions for consumers. For example, a sign according to the invention can recite, "For more information visit www.sharpcar.com and enter the following identification number: 123456." (See FIG. 2). The sign is typically provided for purchase at retail stores such as WalMart, K-Mart, Meijer, pharmacies, superstores, drug stores, grocery stores, hardware stores, discount stores, or any other retail store, and is preferably supplied with instructions detailing how the seller can log onto the website and enter information regarding the good for sale. Preferably, the instructions are provided on an instruction sheet as shown in FIG. 3. Most preferably, the instructions are printed on the reverse side of the sign. Less preferably, the instructions can be provided on a separate sheet.

A website according to the invention is also provided, preferably by the company producing and distributing the signs, and is designed such that the seller, having purchased the sign and following the accompanying directions, can log onto the website where he is prompted to enter certain information regarding the good for sale (e.g. age, condition, price, etc.) as well as his contact information. Such information is then accessible to consumers who see the sign and visit the website indicated on the sign. The website prompts consumers to enter the unique identifier or identification number indicated on the sign to view the information pertaining to a particular good which the consumer saw advertised by the sign. The website also provides the consumer with personal contact information (such as phone number and e-mail address) of the seller so the purchaser can contact the seller and arrange to consummate the transaction, including paying the purchase price and picking up the good.

In addition to allowing consumers to view information specific to a particular good by reference to its unique identifier, the website can also be advantageously adapted to allow consumers to browse all available goods within a particular category (i.e., autos, boats, guns, computers, furniture, houses, etc.) and/or by geographic location (such as by zip code number). A website adapted in this manner has a principal advantage that it does not require consumers to recall the unique identifier on a sign which they have previously seen. Instead, having seen a sign advertising a car, for example, a consumer could log onto the website and browse the list of cars for sale within the geographic region encompassing the location where the consumer saw the sign until he found the car he saw. It will be understood that a hurried consumer will be far more likely to remember a catchy, intuitive website address, e.g. "www.sharpcar.com", than a random sequence of letters or numbers.

Another principal advantage of a website adapted in this manner is that the website owner can further promote the sale of goods advertised thereon to consumers-at-large who have not seen a "FOR SALE" sign, and therefore could not be led to the website thereby. To this end, the website can be promoted to the general consuming public via online, television, radio, billboard, or print advertising, leafleting, mass mailing, or via some other known promotional means. Optionally, the website owner can charge a fee for this additional service. For example, the website owner can charge a fee to the seller of the good, the purchaser, or both. Subsequently, a consumer who heard about the website via some means other than an invented sign, could log onto the website and browse the list of goods in a particular category and geographic location in search of the particular good he seeks to purchase.

The sign can have a description of the good (i.e., "AUTO") preprinted thereon. The sign and website marketing system of the present invention could be used by sellers to market a virtually infinite array of goods and services, a partial list of which follows. The following list is by way of illustration only, and not limitation: "For Sale", "For Sale By Owner", airplanes, antiques, apartments, houses or rooms for rent or sale, appliances, automobiles, banquet and party services, bicycles, boats, carpet cleaning services, clothing, computers, electronics, employment services, estate sales, furniture, garage sales, guns, house cleaning services, house sales, jewelry, labor-for-hire services, landscaping services, laundry services, makeup, musician services, motorcycles, small business services and advertising, and tutoring services.

A marketing system according to the invention represents a unique development in the marketing field because it uniquely links a consumer product (the "For Sale" sign) 1 directly to an e-commerce transaction. Other consumer products, i.e. food, pharmaceuticals, textiles, etc., do not link the retailer, the consumer or the product directly to an internet transaction. By directing consumers to an internet website to obtain information regarding (and perhaps purchase) a particular good for sale, the sign of the present invention directly facilitates an e-commerce transaction.

Optionally, the sign is provided with a container such as a cylindrical tube (for example a Take One Tube as known in the art) into which the seller can deposit a sheet of paper such as a paper flyer containing information about the good for sale. In this embodiment, a consumer can take a flyer to get information about the good for sale immediately upon seeing the sign. The flyers may contain the same or different information as posted on the website. The cylinder or container can be made of opaque or transparent material, preferably plastic, and preferably has waterproof endcaps to protect the paper contents from the elements. The cylinder or container is preferably attachable to the sign by means of tie-downs, hose-clamps or the like.

Once a consumer decides to purchase the good indicated on the sign, the consumer contacts the seller via the indicated contact information and the transaction is consummated by any known means that is acceptable to both the buyer and the seller, such as arranging to pay the purchase price and pick up the good. Payment can be made directly to the seller or the seller's agent. Alternatively, the website can be adapted such that the transaction is consummated online whereby the provider of the website receives payment from the buyer, for example by credit card, and then forwards payment to the seller. Optionally, the website provider can deduct a fee, such as a commission, for this service.

Although the hereinabove described embodiments of the invention constitute the preferred embodiments, it should be understood that modifications can be made thereto without departing from the scope of the invention as set forth in the appended claims.

What is claimed is:

1. A method for marketing a good via a website having a website address and permitting a seller to post information about said good thereon under a unique identifier, said website further permitting a prospective purchaser to enter said unique identifier in order to view said posted information, consisting essentially of the following steps in the following order:

a) providing a physical sign and accompanying directions for logging onto said website, said physical sign having preprinted thereon said website address, a space for said unique identifier, and an indication that a good is for sale or rent, said physical sign being provided for purchase at a retail store, b) a seller of said good purchasing said physical sign and accompanying directions from said retail store, c) said seller, having purchased the sign and following the accompanying directions, logging onto said website to post said information thereon, said unique identifier being provided to said seller or entered by said seller at said website in connection with said seller posting said information on said website, and d) said seller conspicuously placing said sign physically on or adjacent said good for sale or rent, wherein said unique identifier is displayed on said physical sign and corresponds specifically to said good on said website.

2. A method according to claim 1, wherein said unique identifier is preprinted on said sign in said space for a unique identifier.

3. A method according to claim 1, wherein said website provides said unique identifier to said seller in connection with said seller posting said information on said website, thus permitting said seller to thereafter provide said unique identifier in said space on said sign.

4. A method according to claim 1, wherein said sign is provided with a description of said good preprinted thereon.

5. A method according to claim 1, wherein said sign is further provided with a space to indicate a seller's personal contact information.

6. A method according to claim 1, wherein said website is further adapted to permit said prospective purchaser to browse a plurality of goods listed on said website by category, and to view posted information therefor without reference to said unique identifier.

7. A method according to claim 1, wherein said website is further adapted to permit said prospective purchaser to browse a plurality of goods listed on said website by geographic location, and to view posted information therefor without reference to said unique identifier.

8. A method according to claim 1, wherein said sign has preprinted thereon said accompanying directions.

9. A method according to claim 1, said method being adapted to permit a purchaser of said good to make payment for said good directly to the seller or the sellers agent.

10. A method according to claim 1, said method being adapted to permit a purchaser of said good to make payment for said good to a provider of said website, after which said provider will forward said payment to the seller of said good.

11. A method according to claim 10, wherein said provider charges a fee to said seller in connection with said payment.

12. A method according to claim 1, wherein said sign is provided with a container into which said seller can deposit a sheet of paper containing information about said good.

13. A method according to claim 1, further comprising the step of promoting said website to the general consuming public.

14. A method according to claim 1, further comprising the step of charging a fee to said seller in connection with said posting of information on said website.

15. A method according to claim 1, wherein said prospective purchaser, upon viewing said sign, is informed by said sign of the following points prior to logging onto said website:

i. that said good is for sale or rent;

ii. of said website address for said website; and iii. of said unique identifier corresponding to information regarding said good on said website.

16. A method according to claim 1, wherein said good is a good for sale.

17. A method according to claim 16, said good for sale being an automobile.

18. A method according to claim 16, said good for sale being real estate.

19. A method according to claim 16, said unique identifier being preprinted on said sign in said space for a unique identifier.

20. A method according to claim 16, wherein said sign is provided with a description of said good for sale preprinted thereon.

21. A method according to claim 16, wherein said sign is further provided with a space to indicate a seller's personal contact information.

22. A method according to claim 16, wherein said website is further adapted to permit said prospective purchaser to browse a plurality of goods listed on said website by category, and to view posted information therefor without reference to said unique identifier.

23. A method according to claim 16, wherein said website is further adapted to permit said prospective purchaser to browse a plurality of goods listed on said website by geographic location, and to view posted information therefor without reference to said unique identifier.

24. A method according to claim 16, further comprising the step of providing a container into which said seller can deposit a sheet of paper containing information about said good for sale.

25. A method according to claim 16, further comprising the step of promoting said website to the general consuming public.

26. A method according to claim 1, wherein, after step (c), said prospective purchaser views said posted information about said good on said website.

27. A method for marketing a good via a website having a website address and permitting a seller who has a good for sale or rent to post information about said good thereon under a unique identifier, consisting essentially of the following steps in the following order:

a) providing a physical sign and accompanying directions for logging onto said website for purchase by said seller, said sign having said website address preprinted thereon, a space for said unique identifier, and an indication that a good is for sale or rent, b) selling said physical sign to said seller who has a good for sale or rent, and c) said seller, having purchased the sign and following the accompanying directions, logging onto said website and posting said information thereon, said unique identifier being provided to said seller or entered by said seller in connection with said seller's posting said information.

28. A method according to claim 27, said physical sign having preprinted thereon said accompanying directions.

29. A method according to claim 27, said physical sign being offered for sale at a retail store, said seller purchasing said sign at said retail store.

* * * * *